(12) United States Patent
Tugend

(10) Patent No.: US 10,887,004 B2
(45) Date of Patent: Jan. 5, 2021

(54) TELECOMMUNICATIONS SATELLITE, BEAMFORMING METHOD AND METHOD FOR MANUFACTURING A SATELLITE PAYLOAD

(71) Applicants: AIRBUS DEFENCE AND SPACE SAS, Toulouse (FR); CENTRE NATIONAL D'ETUDES SPATIALES (CNES), Paris (FR)

(72) Inventor: Vincent Tugend, Toulouse (FR)

(73) Assignees: AIRBUS DEFENCE AND SPACE SAS, Toulouse (FR); CENTRE NATIONAL D'ETUDES SPATIALES (CNES), Paris (FR)

( * ) Notice: Subject to any disclaimer, the term of this patent is extended or adjusted under 35 U.S.C. 154(b) by 0 days.

(21) Appl. No.: 16/620,066

(22) PCT Filed: Jun. 8, 2018

(86) PCT No.: PCT/EP2018/065195
§ 371 (c)(1),
(2) Date: Dec. 6, 2019

(87) PCT Pub. No.: WO2018/224662
PCT Pub. Date: Dec. 13, 2018

(65) Prior Publication Data
US 2020/0382205 A1    Dec. 3, 2020

(30) Foreign Application Priority Data
Jun. 9, 2017  (FR) ..................... 17 55169

(51) Int. Cl.
*H01Q 19/13*  (2006.01)
*H04B 7/185*  (2006.01)
*H01Q 1/28*   (2006.01)

(52) U.S. Cl.
CPC ......... *H04B 7/18515* (2013.01); *H01Q 1/288* (2013.01); *H01Q 19/13* (2013.01)

(58) Field of Classification Search
CPC .............................. H01Q 1/288; H01Q 19/13
(Continued)

(56) References Cited

U.S. PATENT DOCUMENTS

| 4,298,877 A | * | 11/1981 | Sletten | H01Q 1/1264 343/781 CA |
| 4,342,036 A | * | 7/1982 | Scott | H01Q 5/45 343/836 |

(Continued)

FOREIGN PATENT DOCUMENTS

EP    2779306 A1    9/2014

OTHER PUBLICATIONS

ISA/EPO, PCT International Search Report (English) dated Oct. 17, 2018 issued in PCT International Application No. PCT/EP2018/065195 filed Jun. 8, 2019.

(Continued)

*Primary Examiner* — Hai V Nguyen
(74) *Attorney, Agent, or Firm* — Gottlieb, Rackman & Reisman, P.C.

(57) ABSTRACT

The present invention relates to a telecommunications satellite intended for being placed in earth orbit, comprising an antenna comprising a reflector and a network of sources. In addition, said satellite comprises adaptive analog beamforming networks, said adaptive analog beamforming networks being connected to respective groups of sources other than the network of sources. Each adaptive analog beamforming network is suitable for simultaneously activating a predetermined number of beams serving respective geographic zones inside a geographic region on Earth's surface. Each of group of sources comprises sources shared with other groups (Continued)

Figure 1:
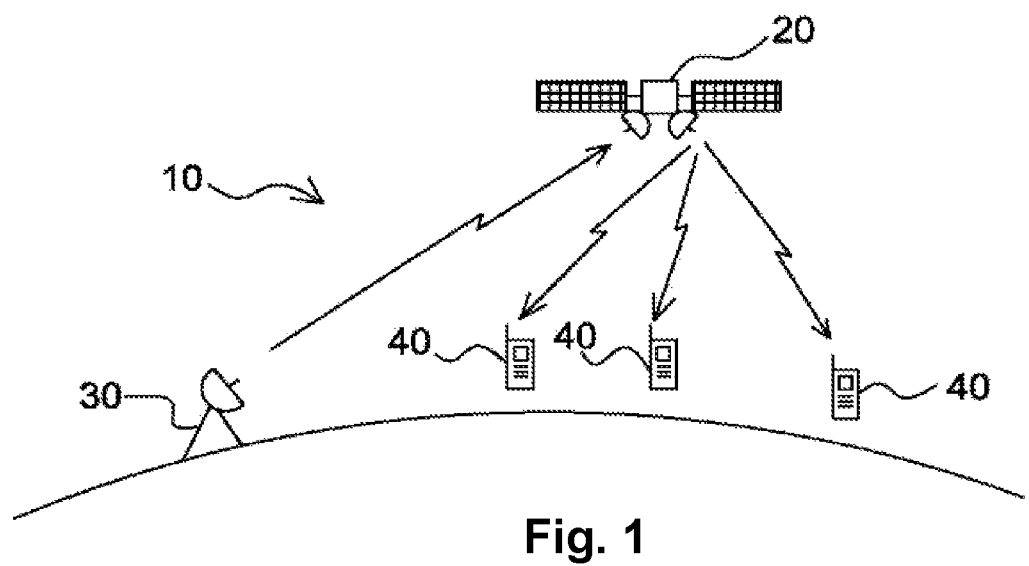

of sources, and at least one geographic region has a geographic overlap of at least 30% with other geographic regions.

11 Claims, 5 Drawing Sheets

(58) Field of Classification Search
USPC .................................................. 455/427, 431
See application file for complete search history.

(56) References Cited

U.S. PATENT DOCUMENTS

| | | | | |
|---|---|---|---|---|
| 4,792,813 A * | 12/1988 | Rosen | H01Q 25/001 | 343/756 |
| 4,855,751 A * | 8/1989 | Ingerson | H01Q 19/17 | 343/779 |
| 4,872,015 A * | 10/1989 | Rosen | H04B 7/1853 | 342/353 |
| 4,972,199 A * | 11/1990 | Raghavan | H01Q 19/17 | 343/756 |
| 5,115,248 A | 5/1992 | Roederer | | |
| 5,130,718 A * | 7/1992 | Wu | H01Q 15/0033 | 343/781 CA |
| 5,162,809 A * | 11/1992 | Wu | H01Q 15/0033 | 343/753 |
| 5,497,169 A * | 3/1996 | Wu | H01Q 15/0033 | 333/134 |
| 5,576,721 A * | 11/1996 | Hwang | H01Q 25/007 | 343/753 |
| 5,634,190 A * | 5/1997 | Wiedeman | H04B 7/195 | 455/13.1 |
| 5,734,345 A * | 3/1998 | Chen | H01Q 3/2694 | 342/367 |
| 5,758,261 A * | 5/1998 | Wiedeman | H04B 7/195 | 455/13.1 |
| 5,903,241 A * | 5/1999 | Bhattacharyya | H01Q 13/0266 | 343/786 |
| 5,903,549 A * | 5/1999 | von der Embse | H04B 7/216 | 370/310 |
| 5,936,591 A | 8/1999 | Yamasa et al. | | |
| 6,043,779 A * | 3/2000 | Lalezari | H01Q 3/26 | 342/371 |
| 6,157,621 A * | 12/2000 | Brown | H01Q 1/242 | 370/310 |
| 6,240,072 B1 | 5/2001 | Lo et al. | | |
| 6,246,364 B1 * | 6/2001 | Rao | H01Q 1/288 | 342/368 |
| 6,252,559 B1 * | 6/2001 | Donn | H01Q 19/19 | 343/756 |
| 6,545,645 B1 * | 4/2003 | Wu | H01Q 19/104 | 343/781 CA |
| 6,678,520 B1 * | 1/2004 | Wang | H04B 7/18513 | 455/13.1 |
| 6,774,861 B2 * | 8/2004 | Choung | H01Q 19/192 | 343/781 CA |
| 6,795,034 B2 * | 9/2004 | Lyerly | H01Q 19/17 | 343/781 CA |
| 6,806,843 B2 * | 10/2004 | Killen | H01Q 3/46 | 343/700 MS |
| 6,831,613 B1 * | 12/2004 | Gothard | H01Q 3/0266 | 343/779 |
| 6,885,355 B2 * | 4/2005 | Killen | H01Q 15/02 | 343/700 MS |
| 6,897,447 B2 * | 5/2005 | Mitra | G01J 3/26 | 250/338.4 |
| 6,900,763 B2 * | 5/2005 | Killen | H01Q 5/0053 | 333/202 |
| 6,937,201 B2 * | 8/2005 | Gothard | H01Q 19/193 | 343/781 CA |
| 6,937,203 B2 * | 8/2005 | Rao | H01Q 3/2658 | 333/125 |
| 6,965,351 B1 * | 11/2005 | Miller | H01Q 1/288 | 343/781 CA |
| 7,015,867 B1 * | 3/2006 | Miller | H01Q 19/062 | 343/755 |
| 7,038,632 B2 * | 5/2006 | Webb | H01Q 19/027 | 343/781 CA |
| 7,135,698 B2 * | 11/2006 | Mitra | H01L 27/14649 | 257/21 |
| 7,161,549 B1 * | 1/2007 | Cuchanski | H01Q 1/288 | 343/781 CA |
| 7,183,966 B1 * | 2/2007 | Schramek | G01S 17/87 | 244/3.1 |
| 7,242,360 B2 * | 7/2007 | Wu | H01Q 19/19 | 343/779 |
| 7,463,207 B1 * | 12/2008 | Rao | H01Q 3/0208 | 343/779 |
| 7,522,116 B2 * | 4/2009 | Balling | H01Q 1/288 | 343/755 |
| 7,605,768 B2 * | 10/2009 | Ebling | H01Q 1/3233 | 343/700 MS |
| 7,643,827 B1 * | 1/2010 | Kiesling | H01Q 19/132 | 455/427 |
| 7,737,903 B1 * | 6/2010 | Rao | H01Q 5/55 | 343/786 |
| 7,751,779 B2 * | 7/2010 | Ho | H04B 7/18515 | 455/12.1 |
| 7,800,549 B2 * | 9/2010 | Rebeiz | H01Q 3/24 | 343/754 |
| 7,868,840 B2 * | 1/2011 | Rao | H01Q 5/45 | 343/786 |
| 8,354,956 B2 * | 1/2013 | Matyas | H01Q 19/12 | 342/354 |
| 8,384,610 B2 * | 2/2013 | Schreider | H01Q 3/20 | 343/781 P |
| 8,514,140 B1 * | 8/2013 | Rao | H01Q 19/132 | 343/786 |
| 8,552,917 B2 * | 10/2013 | Mathews | H01Q 1/288 | 343/779 |
| 8,634,414 B2 * | 1/2014 | Leong | H04B 7/18515 | 370/389 |
| 8,680,450 B2 * | 3/2014 | Pritchard | F41G 7/2293 | 244/3.16 |
| 8,712,321 B1 * | 4/2014 | Dankberg | H04B 7/18519 | 455/12.1 |
| 8,780,000 B2 * | 7/2014 | Palacin | H01Q 25/007 | 343/779 |
| 8,957,821 B1 * | 2/2015 | Rao | H01Q 13/025 | 343/786 |
| 9,014,620 B2 * | 4/2015 | Dankberg | H04B 7/2041 | 455/12.1 |
| 9,054,414 B2 * | 6/2015 | Mizzoni | H01Q 15/147 | |
| 9,153,877 B2 * | 10/2015 | Burr | H01Q 1/288 | |
| 9,246,234 B2 * | 1/2016 | Rao | H01Q 19/19 | |
| 9,318,807 B2 * | 4/2016 | McCarrick | H01Q 19/13 | |
| 9,356,685 B2 * | 5/2016 | Angeletti | H04B 7/2041 | |
| 9,478,861 B2 * | 10/2016 | Fonseca | H01Q 25/30 | |
| 9,548,770 B1 * | 1/2017 | Pawar | H04B 1/0475 | |
| 9,698,492 B2 * | 7/2017 | Rao | H01P 1/2138 | |
| 9,806,433 B2 * | 10/2017 | Buer | H01Q 1/288 | |
| 9,848,370 B1 * | 12/2017 | Freedman | H04B 7/18515 | |
| 9,865,921 B2 * | 1/2018 | Griffith | G02B 17/0605 | |
| 9,912,399 B2 * | 3/2018 | Dankberg | H04B 7/18513 | |
| 9,929,474 B2 * | 3/2018 | Adada | H01Q 19/191 | |
| 9,942,632 B2 * | 4/2018 | Aveline | H04B 10/90 | |
| 10,122,085 B2 * | 11/2018 | Goyette | H01Q 19/17 | |
| 10,170,842 B2 * | 1/2019 | Adada | H01Q 19/17 | |
| 10,193,240 B2 * | 1/2019 | Buer | H01Q 1/288 | |
| 10,243,648 B2 * | 3/2019 | Wyler | H04B 7/1851 | |
| 10,270,524 B2 * | 4/2019 | Burr | H01Q 3/267 | |
| 10,305,195 B2 * | 5/2019 | Burr | H01Q 21/22 | |
| 10,333,218 B2 * | 6/2019 | Runyon | H01Q 3/30 | |
| 10,418,724 B2 * | 9/2019 | Hreha | H01Q 21/24 | |
| 10,498,043 B2 * | 12/2019 | Adada | H01Q 19/17 | |
| 10,511,379 B2 * | 12/2019 | Miller | H04B 7/2041 | |
| 10,555,236 B1 * | 2/2020 | Freedman | H04B 7/18515 | |
| 10,581,482 B2 * | 3/2020 | Briand | H03F 3/195 | |
| 10,637,151 B2 * | 4/2020 | Kang | H01Q 15/148 | |

(56) References Cited

U.S. PATENT DOCUMENTS

| | | | | |
|---|---|---|---|---|
| 10,658,757 B2* | 5/2020 | Jackson | H01Q 19/191 | |
| 2002/0011962 A1* | 1/2002 | Luh | H01Q 19/192 | 343/781 P |
| 2002/0167453 A1* | 11/2002 | Kung | H01Q 13/0208 | 343/786 |
| 2003/0142014 A1* | 7/2003 | Rao | H01Q 13/0208 | 342/354 |
| 2003/0234745 A1* | 12/2003 | Choung | H01Q 19/195 | 343/781 P |
| 2004/0008148 A1* | 1/2004 | Lyerly | H01Q 19/19 | 343/781 P |
| 2004/0017332 A1* | 1/2004 | Rao | H01Q 15/148 | 343/912 |
| 2004/0189538 A1* | 9/2004 | Rao | H01Q 1/288 | 343/757 |
| 2005/0052333 A1* | 3/2005 | Rao | H01Q 25/007 | 343/840 |
| 2005/0104794 A1* | 5/2005 | Rao | H01Q 3/2658 | 343/786 |
| 2008/0153414 A1* | 6/2008 | Ho | H04B 7/18515 | 455/12.1 |
| 2009/0262037 A1* | 10/2009 | Matyas | H01Q 25/007 | 343/779 |
| 2010/0321266 A1* | 12/2010 | Schreider | H01Q 5/45 | 343/777 |
| 2011/0095953 A1* | 4/2011 | Lier | H01Q 15/02 | 343/755 |
| 2011/0110401 A1* | 5/2011 | Leong | H04B 7/18515 | 375/211 |
| 2012/0075149 A1* | 3/2012 | Palacin | H01Q 25/007 | 343/711 |
| 2012/0242539 A1* | 9/2012 | Mizzoni | H01Q 3/2658 | 342/354 |
| 2013/0154874 A1* | 6/2013 | Burr | H01Q 1/288 | 342/188 |
| 2013/0201316 A1* | 8/2013 | Binder | H04L 67/12 | 348/77 |
| 2014/0333498 A1 | 11/2014 | Romier | | |
| 2015/0102973 A1* | 4/2015 | Hand | H01Q 15/14 | 343/836 |
| 2015/0188623 A1* | 7/2015 | Angeletti | H04B 7/2041 | 455/13.3 |
| 2015/0236416 A1* | 8/2015 | Fonseca | H01Q 25/30 | 343/837 |
| 2015/0255883 A1* | 9/2015 | Buer | H04B 7/18515 | 342/354 |
| 2015/0263802 A1* | 9/2015 | Dankberg | H04B 7/18543 | 455/427 |
| 2015/0295640 A1* | 10/2015 | Burr | H01Q 3/267 | 342/354 |
| 2016/0011318 A1* | 1/2016 | Cohen | G01S 19/425 | 342/357.26 |
| 2016/0087713 A1* | 3/2016 | Oderman | H04B 7/18591 | 370/319 |
| 2016/0301463 A1* | 10/2016 | Burr | H04B 7/18584 | |
| 2016/0308603 A1 | 10/2016 | Hirsch et al. | | |
| 2017/0126307 A1* | 5/2017 | Wyler | H04W 72/0453 | |
| 2017/0134835 A1* | 5/2017 | Aveline | H04Q 11/0001 | |
| 2017/0288769 A1* | 10/2017 | Miller | H04B 7/18515 | |
| 2018/0013204 A1* | 1/2018 | Burr | H01Q 1/28 | |
| 2018/0019523 A1* | 1/2018 | Buer | H04B 7/18515 | |
| 2018/0254866 A1* | 9/2018 | Chen | G05D 1/0022 | |
| 2019/0109635 A1* | 4/2019 | Buer | H04B 7/0617 | |
| 2019/0199432 A1* | 6/2019 | Bosshard | H01Q 21/24 | |
| 2019/0199433 A1* | 6/2019 | Bosshard | H04B 7/2041 | |
| 2019/0238176 A1* | 8/2019 | Briand | H04B 1/709 | |
| 2020/0028575 A1* | 1/2020 | Buer | H04B 7/026 | |
| 2020/0076497 A1* | 3/2020 | Agarwal | H04B 7/2041 | |
| 2020/0186242 A1* | 6/2020 | Miller | H04B 7/18543 | |
| 2020/0266882 A1* | 8/2020 | Buer | H01Q 21/24 | |
| 2020/0274611 A1* | 8/2020 | Mendelsohn | H01Q 25/007 | |

OTHER PUBLICATIONS

ISA/EPO, PCT International Search Report (French) and Written Opinion (French) dated Oct. 17, 2018 issued in PCT International Application No. PCT/EP2018/065195 filed Jun. 8, 2019.

* cited by examiner

TELECOMMUNICATIONS SATELLITE, BEAMFORMING METHOD AND METHOD FOR MANUFACTURING A SATELLITE PAYLOAD

CROSS-REFERENCE TO RELATED APPLICATIONS

This application is the United States National Stage entry under 35 U.S.C. 371 of PCT/EP2018/065195, filed Jun. 8, 2018, which in turn claims the priority of French Patent Application No. 1755169, filed Jun. 9, 2017, the contents of each of which are hereby incorporated by reference in their entirety.

TECHNICAL FIELD

The present invention relates to the field of satellite telecommunications system and concerns a satellite comprising a multibeam antenna, in addition to a beam-forming method and a method for producing a telecommunications satellite payload.

PRIOR ART

In a conventional manner, a telecommunications satellite comprises a payload equipped with means suitable for exchanging data with one or more terrestrial gateway stations, and with one or more terrestrial user terminals. The term "terrestrial" must be understood herein to mean on the surface of the Earth, in particular on the ground, at the top of a building or pylon, etc., that is incapable or capable of moving (land, sea or air vehicle).

Each gateway station creates, for the satellite, an access point to a terrestrial core network. Thus, a gateway station that receives, from the core network, data intended for a user terminal, emits said data to the satellite, which retransmits said data to said user terminal. Similarly, the user terminal can emit data to the satellite, which retransmits said data to a gateway station, which in turn retransmits said data to the core network.

There is a significant need today to increase the capacity of satellite telecommunications systems in order to provide so-called broadband services, and/or to feed more user terminals, etc. Preferably, such an increase in capacity must be accompanied by high flexibility and/or large geographical coverage.

However, such an increase in capacity and/or flexibility and/or geographical coverage is generally accompanied, with conventional payload architectures, by a significant increase in the complexity, mass and volume of the payload of the satellite.

DESCRIPTION OF THE INVENTION

The purpose of the present invention is to overcome all or part of the limitations of the solutions of the prior art, in particular those described hereinabove.

For this purpose, and according to a first aspect, the invention relates to a telecommunications satellite intended to be placed in earth orbit, comprising an antenna having a reflector and an array of feed elements, wherein:
  said satellite comprises adaptive analogue beam-forming networks, said adaptive analogue beam-forming networks being connected to different respective groups of feed elements of the array of feed elements,
  each adaptive analogue beam-forming network is suitable for simultaneously activating a predetermined number of beams serving respective geographic zones within a geographic region on the Earth's surface.
  said satellite comprises a module for controlling said adaptive analogue beam-forming networks, configured so as to modify the active beams of each adaptive analogue beam-forming network,
  each group of feed elements comprises feed elements shared with other groups of feed elements,
  the geographic regions served by different adaptive analogue beam-forming networks are different and at least one geographic region has a geographic overlap of at least 30% with other geographic regions.

Thus, the array of feed elements is broken down into a plurality of groups of feed elements serving different respective geographic regions, each group of feed elements comprising a reduced number of feed elements compared to the total number of feed elements of the array. Each group of feed elements is connected to an adaptive analogue beam-forming network. Each adaptive analogue beam-forming network is suitable for forming numerous possible beams within the associated geographic region; however, only a limited number of beams must be activated simultaneously such that the adaptive analogue beam-forming networks, which serve a reduced number of feed elements, are not very complex to produce.

Furthermore, each group of feed elements shares feed elements with other groups of feed elements, such that different geographic regions can be served with a high rate of geographic overlap therebetween. Thus, at an area of geographic overlap, the maximum number of active beams that can be formed is increased since an area of geographic overlap is served by at least two adaptive analogue beam-forming networks.

Thus, the satellite can form a high number of possible beams, and thus procures a diverse range of geographic zones that can be served on the Earth's surface. These geographic zones cannot all be served at the same time; however, all of these geographic zones can be served, if necessary, by modifying the set of active beams over time, thus carrying out beam hopping. Although the maximum number of beams capable of being activated simultaneously by each adaptive analogue beam-forming network is limited, a large number of active beams can nonetheless be formed simultaneously at an area of geographic overlap between geographic regions. Typically, the areas of geographic overlap are selected such that they correspond to zones requiring high communication capacity.

According to specific embodiments, the satellite can further comprise one or more of the following features, which must be considered singly or according to any combinations technically possible.

According to specific embodiments, each group of feed elements comprises at least 30% feed elements shared with other groups of feed elements, or even at least 50% shared feed elements or more.

According to specific embodiments, the satellite comprises, for at least one group of feed elements, two adaptive analogue beam-forming networks of different respective polarisations.

According to specific embodiments, the satellite comprises, for each group of feed elements, two adaptive analogue beam-forming networks of different respective polarisations.

According to specific embodiments, at least two geographic regions have different surface areas.

According to specific embodiments, the groups of feed elements comprise the same number of feed elements.

According to specific embodiments, at least two groups of feed elements comprise a different number of feed elements.

According to specific embodiments, at least two adaptive analogue beam-forming networks are suitable for simultaneously forming different respective numbers of beams.

According to specific embodiments, the array of feed elements is offset relative to a focal point of the reflector of the antenna.

According to specific embodiments, the satellite further comprises at least one static analogue beam-forming network connected to a group of feed elements of the array of feed elements.

According to specific embodiments, the adaptive analogue beam-forming networks are suitable for forming beams using different respective frequency bands.

According to specific embodiments, at least one group of feed elements is constituted by feed elements arranged unevenly.

According to a second aspect, the invention relates to a method for the formation of beams by a telecommunications satellite according to any one of the embodiments of the invention, wherein the control module controls each adaptive analogue beam-forming network so as to carry out, over time, beam hopping in each of the geographic regions served by said adaptive analogue beam-forming networks.

According to specific embodiments, the beam-forming method can further comprise one or more of the following features, which must be considered singly or according to any combinations technically possible.

According to specific embodiments, the beam-forming method comprises:
  obtaining requests to allocate resources in order to exchange data with user terminals located in geographic zones served by the satellite,
  determining, for each adaptive analogue beam-forming network, a sequence of beams to be formed as a function of said requests to allocate resources,
  controlling the adaptive analogue beam-forming networks so as to form said determined sequences of beams as a function of the requests to allocate resources.

According to specific embodiments, the beam-forming method comprises controlling at least two different adaptive analogue beam-forming networks in order to form at least two beams serving one or more geographic zones located in the area of geographic overlap of the geographic regions served by the at least two adaptive analogue beam-forming networks.

According to specific embodiments, the beam-forming method comprises controlling at least two different adaptive analogue beam-forming networks in order to form at least two beams serving the same geographic zone located in the area of geographic overlap of the geographic regions served by the at least two adaptive analogue beam-forming networks, said at least two formed beams being of different respective polarisations and/or using separate respective frequency bands.

According to a third aspect, the invention relates to a method for producing a payload for a telecommunications satellite according to any of the embodiments of the invention, comprising, for a predetermined configuration of the reflector and array of feed elements;
  selecting geographic regions to be served on the Earth's surface,
  selecting, for each geographic region, geographic zones of said geographic region to be served by different beams,
  determining, for each geographic region, a barycentre of the centres of the geographic zones to be served,
  selecting, for each geographic region, a group of feed elements to be used to serve the geographic region considered as a function of the barycentre of said geographic region considered,
  assembling adaptive analogue beam-forming networks and the array of feed elements such that each adaptive analogue beam-forming network is connected to one of the groups of feed elements selected.

According to specific embodiments, the group of feed elements selected to serve a geographic region corresponds to the feed elements having the best gain in the direction of the barycentre of said geographic region.

PRESENTATION OF THE FIGURES

Figure 2:
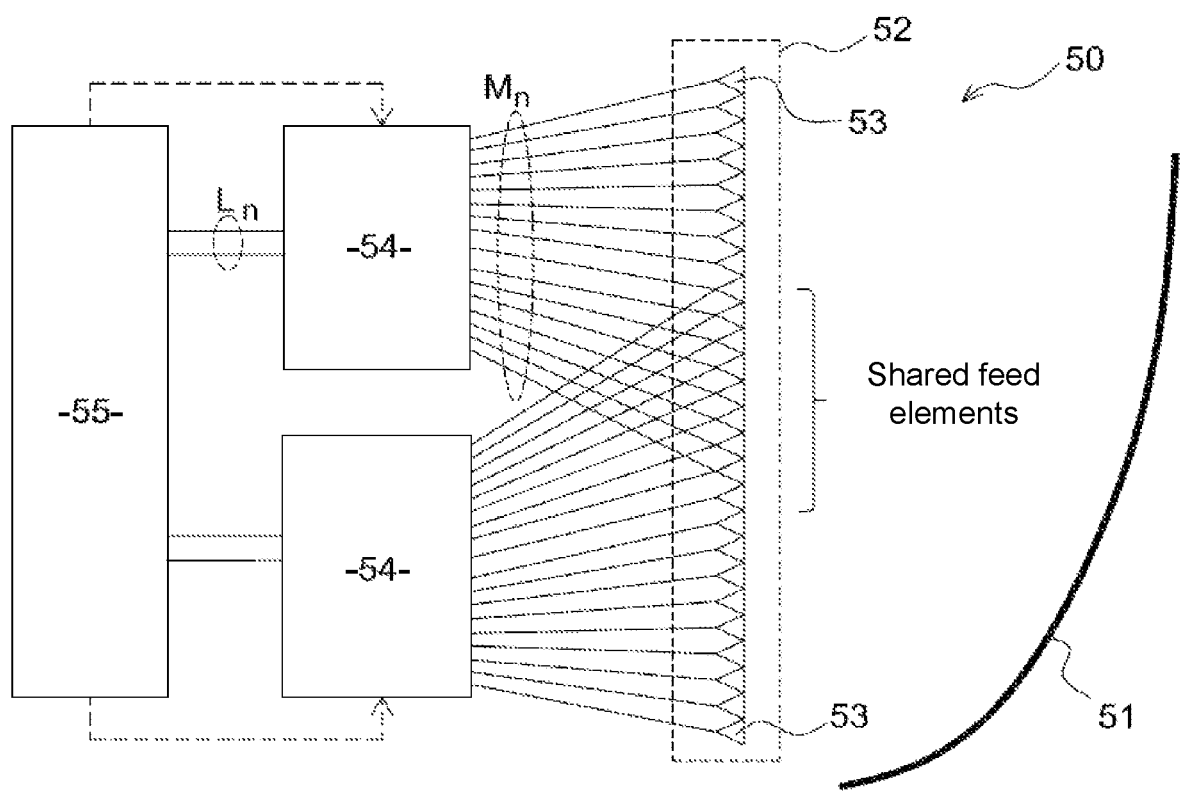
Figure 3:
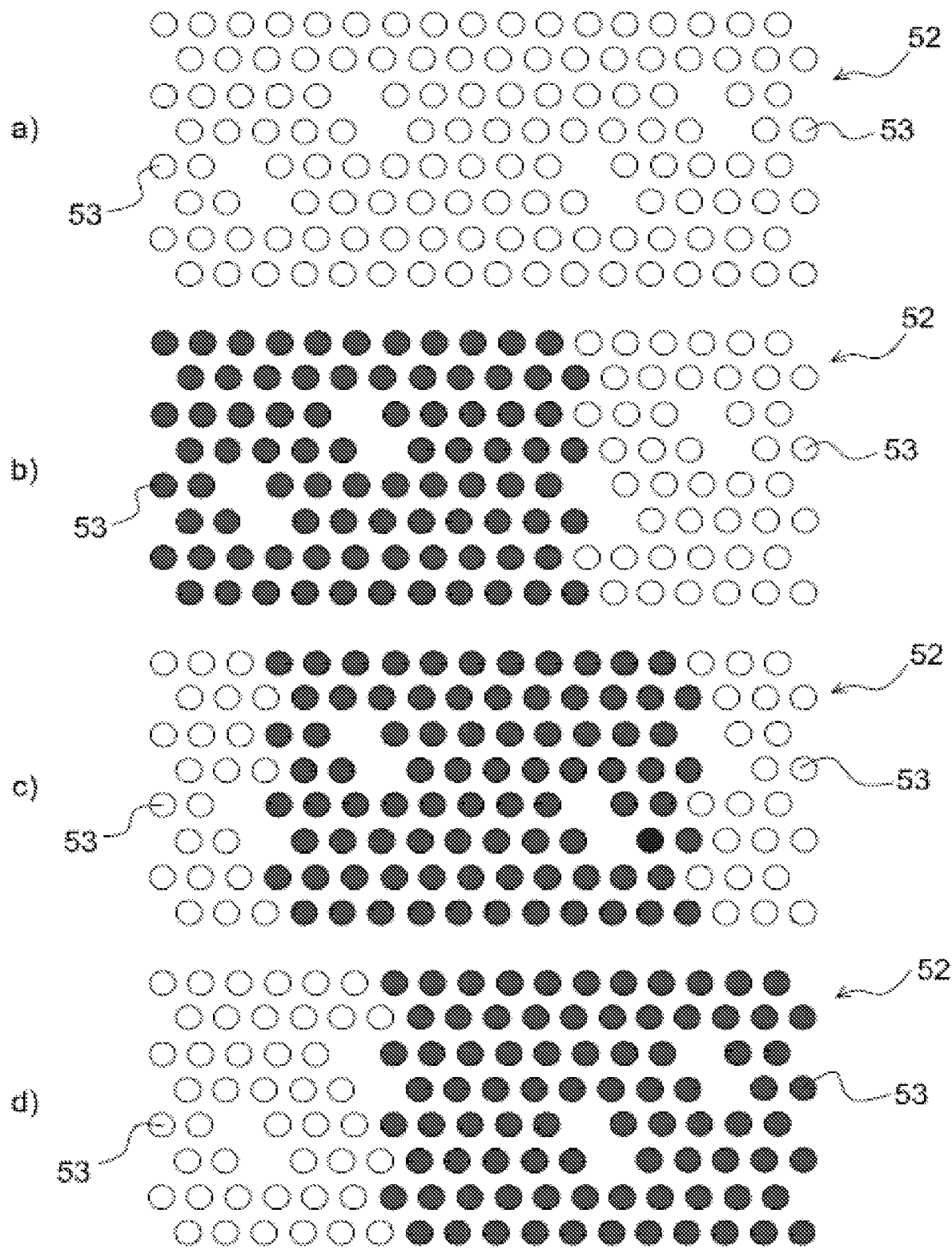
Figure 4:
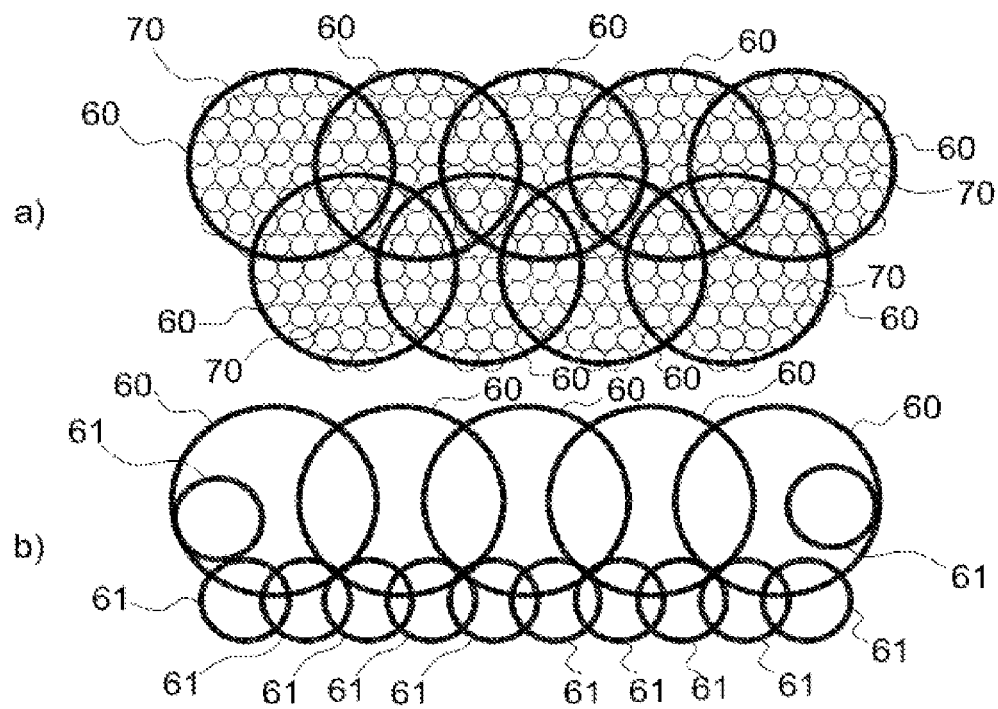
Figure 5:
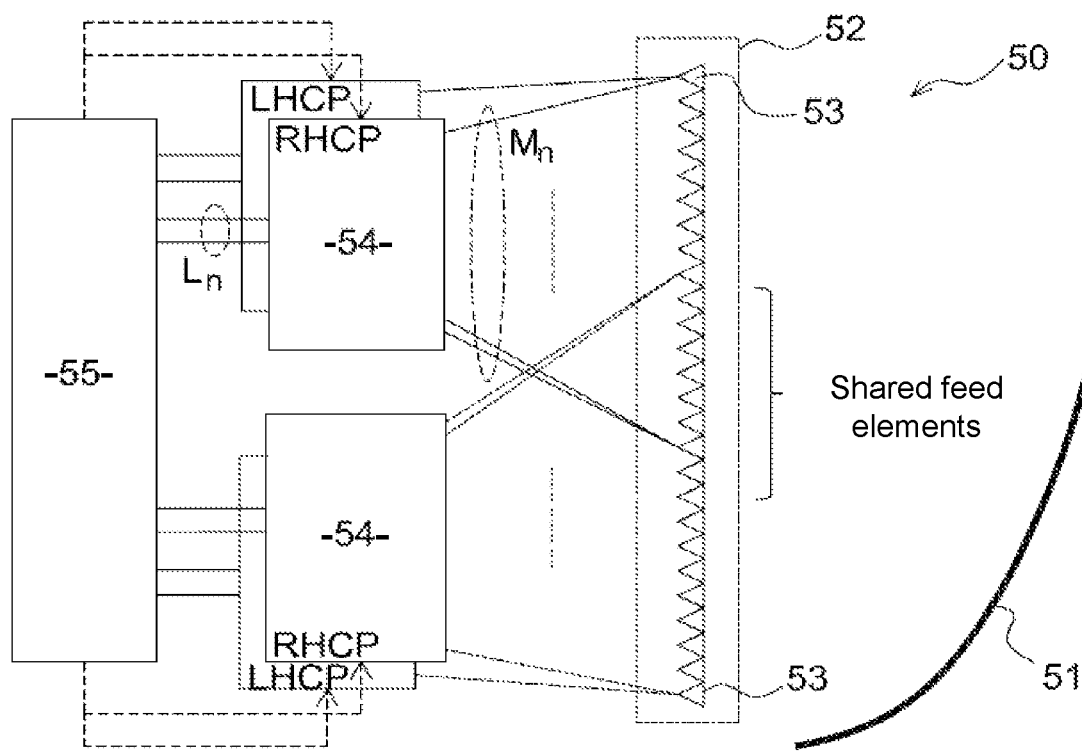
Figure 6:
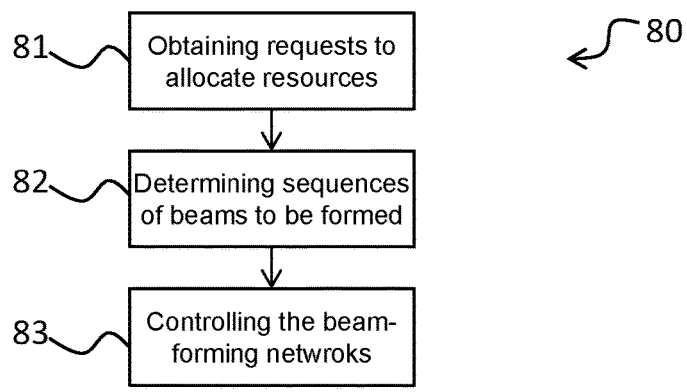
Figure 7:
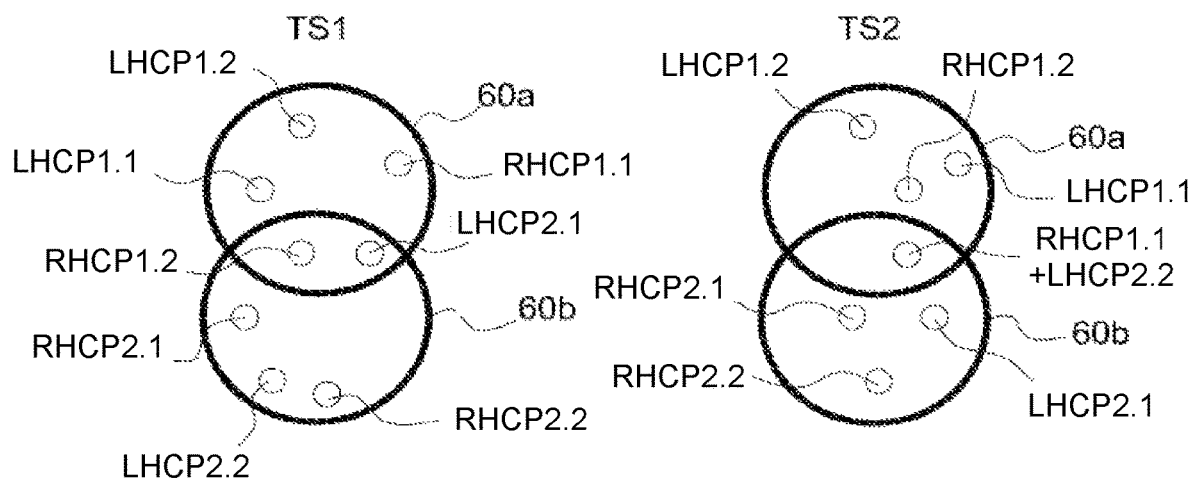
Figure 8:
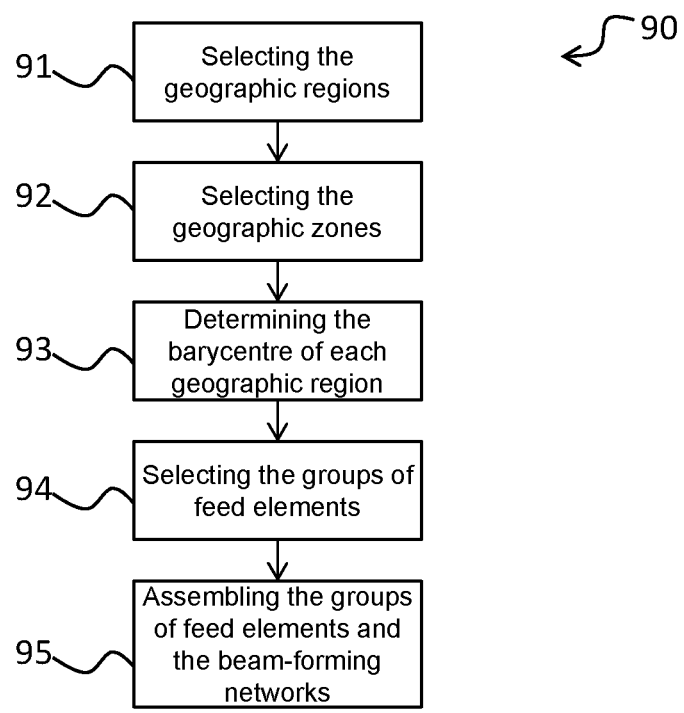

The invention will be better understood after reading the following description, intended for purposes of illustration only and not intended to limit the scope of the invention, with reference to the following figures which represent:

FIG. 1: a diagrammatic view of one example of a satellite telecommunications system, FIG. 2: a diagrammatic view of one example embodiment of a satellite payload, FIG. 3: an example embodiment of an array of feed elements and partitioning of said array into groups of feed elements, FIG. 4: examples of served geographic regions on the Earth's surface, FIG. 5: a diagrammatic view of a preferred embodiment of a satellite payload, FIG. 6: a diagram showing the main steps of a beam-forming method, FIG. 7: a diagrammatic view showing an example of use of the multibeam payload in FIG. 5, FIG. 8: a diagram showing the main steps of a method for producing a satellite payload.

In these figures, identical reference numerals in one or another figure denote identical or similar elements. For clarity purposes, the elements shown are not to scale, unless specified otherwise.

DETAILED DESCRIPTION OF THE EMBODIMENTS

FIG. 1 diagrammatically illustrates one example embodiment of a satellite telecommunications system 10.

As shown in FIG. 1, the satellite telecommunications system 10 comprises at least one satellite 20, at least one terrestrial gateway station 30 and at least one terrestrial user terminal 40.

The description hereinbelow refers to the non-limiting case whereby the satellite 20 is in a geostationary orbit (GEO). However, according to other examples, a non-geostationary earth orbit is not excluded, such as a Low Earth Orbit (LEO) or a Medium Earth Orbit (MEO), etc.

In a conventional manner, the satellite 20 comprises a payload 50 suitable for exchanging data with the gateway station 30 over a gateway link (known as a feeder link), and for exchanging data with each user terminal 40 over a user link (known as a feeder link). The present invention is applicable to communications emitted and/or received over the user link and/or over the feeder link.

The remainder of the description hereinbelow refers to the non-limiting case whereby beams are formed over the user link in the emission direction (i.e. data exchange from the satellite 20 to the user terminals 40, said data having been previously received over the feeder link). Emissions over the user link take place, for example, in one or more frequency bands from the W, Q, V, Ka, Ku, L, S, and C bands etc. However, the examples given hereinbelow are applicable, in alternation or combination, to communications received over the user link, and/or to communications emitted and/or received over the feeder link.

FIG. 2 diagrammatically illustrates one example embodiment of a payload 50 intended to be embedded in the satellite 20.

As shown in FIG. 2, the payload 50 comprises, for emitting data to user terminals 40, an antenna comprising a reflector 51 and an array 52 of feed elements 53. Preferably, the array 52 of feed elements 53 is offset relative to a focal point of the reflector 51 of the antenna, and is arranged between said focal point and the reflector 51 (known as a Defocused Array Fed Reflector or DAFR). However, according to other examples, the positioning of the array of feed elements 53 at said focal point of the reflector 51 is not excluded (known as an Array Fed Reflector or AFR).

The payload 50 further comprises a plurality of adaptive analogue beam-forming networks 54 (BFN) which are connected to the different feed elements 53 of the array. The term "analogue" must be understood herein to mean that each of these beam-forming networks carries out processing operations on analogue signals (electric or microwave signals) and not on digital signals. The term "adaptive" must be understood herein to mean that the beams formed by each of these beam forming networks can vary over time. The adaptive analogue beam-forming networks 54 can be of any type known by a person skilled in the art, including of the phase shifter type or of the true time delay type.

Each adaptive analogue beam-forming network 54 comprises one or more input ports over which it receives one or more signals comprising data to be emitted, and a plurality of output ports connected to different feed elements 53 of the array 52. Each adaptive analogue beam-forming network 54 further comprises, for example, in a manner known to a person skilled in the art, duplicator circuits which duplicate each signal received over an input port, in addition to:
- phase shifter circuits suitable for introducing a controlled-phase shift and controlled-gain amplifiers for beam-forming networks of the phase shifter type,
- controlled-time delay circuits and controlled-gain amplifiers for beam-forming networks of the true time delay type.

An adaptive analogue beam-forming network 54 supplies, over the output ports, replicas of each signal having phases (beam-forming networks of the phase shifter type) or time delays (beam-forming network of the true time delay type) and respective gains allowing predetermined beams to be formed, in conjunction with the feed elements 53 and the reflector 51 of the antenna.

Said adaptive analogue beam-forming networks 54 are connected to different respective groups of feed elements of the array of feed elements 53. Thus, each adaptive analogue beam-forming network 54 is connected to a specific group of feed elements 53 of the array 52. Each beam is thus formed by means of a plurality of feed elements 53 (known as Multiple Feeds Per Beam or MFPB).

For example, the payload 50 comprises $N_{GS}$ groups of feed elements 53 and thus at least $N_{GS}$ adaptive analogue beam-forming networks 54, each comprising $L_n$ input ports and $M_n$ output ports connected to $M_n$ feed elements 53 of the array 52, $1 \leq n \leq N_{GS}$. The total number of feed elements 53 of the array 52 is denoted by $N_S$, and the number $M_n$ of feed elements of each group of feed elements is strictly less than $N_S$, $1 \leq n \leq N_{GS}$. For the adaptive analogue beam-forming network 54 of rank n, $1 \leq n \leq N_{GS}$, the number $L_n$ of input ports corresponds to the maximum number of beams that said adaptive analogue beam-forming network 54 can simultaneously activate to serve respective geographic zones within a predetermined geographic region on the Earth's surface. The geographic zones that can be served by beams within the predetermined geographic region can be either predefined according to a predefined distribution within said geographic region, or defined in an opportunistic and dynamic manner, for example so as to centre one or more beams on cities or geographic regions with very high demand. The number of different geographic regions capable of being served over time by beams, within the geographic region associated with said adaptive analogue beam-forming network 54, can be high, for example far greater (at least by a factor of 10) than the number $L_n$ of input ports of said adaptive analogue beam-forming network 54. However, said adaptive analogue beam-forming network 54 can only simultaneously activate at most $L_n$ different beams, thus simultaneously serving no more than $L_n$ different geographic zones within said geographic region.

In the non-limiting example shown in FIG. 2, the number of groups of feed elements 53 is equal to two ($N_{GS}=2$), as is the number of adaptive analogue beam-forming networks 54. However, this does not rule out the consideration of a larger number of groups of feed elements. In particular, if the number $N_S$ of feed elements 53 of the array 52 is high (one or more thousand feed elements 53), then the payload 50 can generally comprise one or more hundred groups of feed elements.

In preferred embodiments, the number $L_n$ of input ports (and of beams capable of being simultaneously activated) is far lower (at least by a factor of 10) than the number $M_n$ of output ports (and of feed elements of the group of feed elements), in order to reduce the complexity of each adaptive analogue beam-forming network 54.

It should be noted that the number $L_n$ of input ports and the number $M_n$ of output ports can vary from one adaptive analogue beam-forming network 54 to another. In particular, the number $L_n$ of input ports (and of beams capable of being simultaneously activated) can be higher for an adaptive analogue beam-forming network 54 serving a geographic region having high needs in terms of communication capacity, etc. Similarly, the number $M_n$ of output ports (and of feed elements of the group of feed elements) can be higher for an adaptive analogue beam-forming network 54 that must form very directive beams and/or serving geographic zones of complex shapes, etc.

The remainder of the description hereinbelow refers to the non-limiting case whereby the analogue beam-forming networks 54 all have the same number L of input ports and the same number M of output ports (such that the groups of feed elements all have the same number M of feed elements).

As shown in FIG. 2, the payload 50 comprises a module 55 for controlling said adaptive analogue beam-forming networks 54, configured so as to modify the active beams of each adaptive analogue beam-forming network. The control module 55 comprises, for example, one or more processors and storage means (magnetic hard drive, electronic memory, optical disc, etc.) in which a computer program product is stored, in the form of a set of program code instructions to be executed. Alternatively or additionally, the control module 55 comprises one or more programmable logic devices (FPGA, PLD, etc.), and/or one or more application-specific integrated circuits (ASIC, etc.), and/or a set of discrete electronic components, etc.

In the example shown in FIG. 2, and in a non-limiting manner, the control module 55 further supplies the signals at the input of the adaptive analogue beam-forming networks 54. For this purpose, the control module 55 can comprise, according to specific embodiments, one or more analogue-to-digital converters for converting the signals received over the feeder link, and one or more digital-to-analogue converters for converting the signals to be emitted over the user link, to be supplied at the input of the adaptive analogue beam-forming networks 54. However, according to other examples, the supply of signals at the input of the adaptive analogue beam-forming networks 54 by equipment that is separate from the control module 55 is not excluded, which equipment can in particular carry, in an analogue manner, the signals received over the feeder link to said adaptive analogue beam-forming networks 54.

As shown in FIG. 2, each group of feed elements comprises feed elements 53 shared with other groups of feed elements. In other words, feed elements 53 belong to a plurality of groups of feed elements. In this manner, the geographic regions served by the different adaptive analogue beam-forming networks 54 can have a high level of geographic overlap therebetween. Thus, at areas of geographic overlap, the maximum number of active beams that can be formed is increased since each area of geographic overlap is served by at least two adaptive analogue beam-forming networks 54. At least one geographic region, and preferably each of the geographic regions, has a geographic overlap of at least 30% with other geographic regions served by the satellite 20 so as to have large surface areas on the Earth's surface for which beams can be formed simultaneously with a plurality of adaptive analogue beam-forming networks 54. The level of overlap can be, according to specific embodiments, greater than 50% for all or part of the geographic regions. In particular, a geographic region can be obtained having a level of overlap of 100% with other geographic regions, i.e. that is entirely served by one or more other adaptive analogue beam-forming networks 54. The purpose of such a geographic region is to locally strengthen the maximum communication capacity that can be provided.

FIG. 3 diagrammatically illustrates one non-limiting example of an array 52 of feed elements 53 and partitioning thereof into groups of feed elements.

In the example shown in FIG. 3, three groups of feed elements are defined, which use all of the feed elements 53 of the array of feed elements, i.e. all of the feed elements 53 of the array of feed elements that are connected to adaptive analogue beam-forming networks.

More particularly, part a) in FIG. 3 diagrammatically shows all of the feed elements of the array of feed elements, part b) shows a first group of feed elements, part c) shows a second group of feed elements and part d) shows a third group of feed elements. In parts b-d) in FIG. 3, the feed elements 53 used by the considered group of feed elements are shown filled in in black whereas the feed elements 53 not used by the considered group of feed elements are shown filled in in white.

In the non-limiting example shown in FIG. 3, the level of feed elements 53 shared by each group of feed elements is high, for example greater than or equal to 50%. This level of feed elements can also be even higher in some embodiments of groups of feed elements, for example greater than or equal to 70%. Such arrangements allow a high level of geographic overlap between geographic regions to be obtained, while having a high beam gain regardless of the geographic zone served within a geographic region. Moreover, the higher the level of shared feed elements, the higher the possible power-sharing between the beams formed by different groups of feed elements, which allows for the more efficient use of the power embedded in the satellite 20.

As shown in FIG. 3, one (or more) group(s) of feed elements can be formed by feed elements 53 arranged in an uneven manner. More specifically, it has been observed that each group of feed elements 53, in these examples, comprises holes corresponding to feed elements of the array that have purposefully not been installed. The presence of holes in the array of feed elements has very little effect on the overall radiation of the antenna. More specifically, feed elements can be omitted in the case whereby the array 52 of feed elements 53 is offset relative to the focal point of the reflector 51 (for example in the case of a DAFR antenna), since a plurality of feed elements 53 are used to form a beam. However, by providing such holes, the total number of feed elements is lower compared to feed elements installed in an even manner, such that the cost of manufacture and the overall mass of the array of feed elements are reduced.

FIG. 4 diagrammatically illustrates two examples of geographic regions on the Earth's surface served by the payload 50 embedded in the satellite 20 orbiting the Earth. To simplify the reading of FIG. 4, the geographic regions are shown on the Earth's surface as all having a substantially circular shape. However, according to other examples not shown in the figures, geographic regions of more complex shapes are not excluded.

As stated hereinabove, each geographic region has a geographic overlap with other geographic regions. At an area of geographic overlap, the maximum number of beams that can be simultaneously activated corresponds to K·L, where K is the number of adaptive analogue beam-forming networks 54, greater than or equal to 2, serving said area of geographic overlap.

In part a) of FIG. 4, the different geographic regions 60 have substantially the same surface area. Within a geographic region 60, the geographic zones 70 served by different beams can indifferently have different surface areas or substantially the same surface area. In the non-limiting example shown in part a) of FIG. 4, the geographic zones 70 are all considered to have the same surface area within each geographic region 60, and from one geographic region to another geographic region.

In part b) of FIG. 4, the different geographic regions do not all have substantially the same surface area. More particularly, part b) of FIG. 4 shows geographic regions 60 having large surface areas and geographic regions having small surface areas. To simplify the reading of part b) of FIG. 4, the geographic zones within the geographic regions 60, 61 are not shown. However, the geographic zones served within a geographic region 60 having a large surface area preferably have a surface area that is greater than that of the geographic zones served within a geographic region 61 having a small surface area. As shown by part b) of FIG. 4, the entire area (100%) of some geographic regions 61 with a low surface area overlap with a geographic region 60 with a large surface area, the purpose whereof is to provide, locally in said geographic region 60 with a large surface area, a greater communication capacity.

It should be noted that the different beams can use the same frequency bands. In particular, preferably, each formed beam can use the entirety of the frequency spectrum allocated to the satellite telecommunications system 10. However, according to other examples, adaptive analogue beam-forming networks 54 suitable for forming beams using different respective frequency bands, which can vary from one beam to another and which can preferably vary over time, are not excluded. For example, if two beams must be formed to serve adjacent geographic zones, separate respective frequency bands can be used in these beams in order to limit interference. Moreover, as a result of regulatory restrictions, it may be necessary to avoid certain frequency bands in certain geographic zones.

FIG. 5 diagrammatically illustrates a preferred embodiment of the payload 50 of the satellite 20. In the example shown in FIG. 5, each group of feed elements 53 is connected to two adaptive analogue beam-forming networks 54 of different respective polarisations.

In the example shown in FIG. 5, each group of feed elements 53 is connected to an adaptive analogue beam-forming network 54 having right-hand circular polarisation (denoted by "RHCP" in FIG. 5) and an adaptive analogue beam-forming network 54 having left-hand circular polarisation (denoted by "LHCP" in FIG. 5). The corresponding feed elements 53 of the array 52 thus have dual polarisation, for example right-hand circular polarisation and left-hand circular polarisation.

Such arrangements allow the communication capacity to be increased since twice as many beams can be formed with the same group of feed elements 53, by forming beams of different polarisations. The use of beams of different polarisations allows interference between beams to be limited, such that two beams of different polarisations serving the same geographic zone can be formed simultaneously, at a given moment in time, without said beams of different polarisations interfering with one another. Thus, the use of beams of different polarisations allows the communication capacity to be doubled locally at this geographic zone. However, the use of beams of different polarisations can also be used to simultaneously serve, at a given moment in time, a larger number of geographic zones. More specifically, owing to the presence of two adaptive analogue beam-forming networks 54 of different respective polarisations, beams of different respective polarisations can be formed simultaneously, for example beams having right-hand circular polarisation and left-hand circular polarisation, the right-hand circularly polarised beams serving geographic zones that can be different from the geographic zones simultaneously served by left-hand circularly polarised beams.

It should be noted that the example illustrated in FIG. 5 shows a preferred embodiment wherein each group of feed elements 53 is connected to two adaptive analogue beam-forming networks 54 of different respective polarisations. However, according to other examples, one or more groups of feed elements 53 that are each only connected to a single adaptive analogue beam-forming network 54 are not excluded. Where appropriate, the groups of feed elements 53 that are connected to two adaptive analogue beam-forming networks 54 are those that are intended to serve geographic regions having high needs in terms of communication capacity. The beam-forming networks 54 of different polarisations connected to the same group of feed elements 53 can comprise the same number of input ports or different numbers of input ports, depending on the communication capacity demand of the geographic regions concerned.

As stated hereinabove, the control module 55 controls the adaptive analogue beam-forming networks 54 in order to modify, over time, the active beams of each adaptive analogue beam-forming network. Thus, the control module 55 implements all or part of the steps of a beam-forming method 80 which carries out, over time, beam hopping in each of the geographic regions served by the adaptive analogue beam-forming networks 54.

FIG. 6 diagrammatically illustrates the main steps of a preferred embodiment of a beam-forming method 80. As shown in FIG. 6, the beam-forming method 80 comprises:
- a step 81 of obtaining requests to allocate resources in order to exchange data with user terminals located in geographic zones served by the satellite,
- a step 82 of determining, for each adaptive analogue beam-forming network 54, a sequence of beams to be formed as a function of said requests to allocate resources,
- a step 83 of controlling the adaptive analogue beam-forming networks 54 so as to form said determined sequences of beams as a function of the requests to allocate resources.

The requests to allocate resources are, for example, obtained (step 81) by a ground station, such as the gateway station 30, which determines (step 82) the sequences of beams to be formed in order to meet said requests to allocate resources in a predetermined time window. Each sequence of beams corresponds to the different beams to be successively activated during this predetermined time window in order to meet, in the corresponding geographic region, said requests to allocate resources. Said sequences of beams are then transmitted to the satellite 20, and are produced by the control module 55 (step 83) by controlling the adaptive analogue beam-forming networks 54. However, according to other examples, the performance by the control module 55 of step 82 of determining sequences of beams and potentially step 81 of obtaining requests to allocate resources also at the satellite 20 is not excluded.

As stated hereinabove, if necessary in order to meet the requests to allocate resources, the beam-forming method 80 can comprise controlling at least two different adaptive analogue beam-forming networks 54 in order to form at least two beams serving one or more geographic zones located in the area of geographic overlap of the geographic regions served by said at least two adaptive analogue beam-forming networks 54. In the case whereby said at least two adaptive analogue beam-forming networks 54 are controlled in order to form at least two beams serving the same geographic zone, said at least two beams preferably have different respective polarisations and/or use separate respective frequency bands (i.e. without frequency overlap therebetween), in order to limit interference.

As stated hereinabove, the determination step 82 aims to determine the sequences of beams to be formed in order to best meet the requests to allocate resources in a predetermined time window.

The requests to allocate resources can be used to identify the geographic zones to be served during the time window, and thus the adaptive analogue beam-forming networks 54 (and groups of feed elements) allowing the corresponding geographic zones to be served.

For each adaptive analogue beam-forming network 54, the time window can be broken down into one or more consecutive time slots. The breakdown of the time window into time slots can vary from one adaptive analogue beam-forming network 54 to another. Moreover, the time slots of the time window can have the same duration, which can be constant or variable, from one time window to another, or can have respective durations that are not all identical, constant or variable from one time window to another. The remainder of the description hereinbelow refers to the non-limiting case whereby all of the time slots have the same duration, which can be a predefined constant, or which can be determined as a function of the requests to allocate resources.

Each sequence of beams to be formed by an adaptive analogue beam-forming network 54 thus comprises a plurality of lists of beams to be formed, respectively associated with the different time slots of the time window. The purpose of the determination step 82 is thus to determine a plurality of such sequences of beams to be formed, respectively associated with the different adaptive analogue beam-forming networks 54, allowing the different requests to allocate resources to be best met.

During the determination step 82, thanks to the payload 50 and in the case of a geographic zone located in an area of geographic overlap, the adaptive analogue beam-forming network 54 used to serve this geographic zone can be modified at each time slot. This provides an additional degree of freedom in optimising the allocation of the capacity provided and allows the load on the entire antenna of the payload to be optimally balanced.

A first approach for determining the sequences of beams to be formed by the different adaptive analogue beam-forming networks 54 consists, for example, of firstly choosing the beams to be formed during the different time slots of the time window as a function of the requests to allocate resources. Then, for each of these time slots, an optimisation algorithm (for example of the greedy algorithm type) is used to allocate these beams to the different adaptive analogue beam-forming networks 54 with the restriction of balancing the load on the antenna (i.e. simultaneously activating a maximum number of beams for each adaptive analogue beam-forming network 54/group of feed elements). This optimisation algorithm takes into consideration (as an input datum) the list of the possible adaptive analogue beam-forming networks 54 for each beam to be formed. In such an approach, the definition of the beams to be formed and the allocation of the beams to be formed/adaptive analogue beam-forming networks 54 to be used are ordered in a sequential manner, which gives a fast solution, however which can be sub-optimal.

Another non-limiting approach consists of carrying out simultaneous optimisation of the definition of the beams to be formed and allocation of the beams to be formed/adaptive analogue beam-forming networks 54 to be used, again with the restrictions involving best meeting the requests to allocate resources and balancing the load on the antenna.

Once the sequences of beams to be formed have been determined (step 82), the control signals of the adaptive analogue beam-forming networks 54 can be determined (dynamically calculated on board or on the ground, or pre-loaded from a static table on board or on the ground), and applied during the control step 83.

FIG. 7 diagrammatically illustrates an example of use of the payload 50 shown in FIG. 5. More particularly, FIG. 7 shows a first geographic region 60*a* and a second geographic region 60*b* served by two different groups of feed elements, in addition to the geographic zones served by the beams formed.

Each group of feed elements is connected to two adaptive analogue beam-forming networks 54 having different respective polarisations, for example right-hand circular polarisation and left-hand circular polarisation. In the non-limiting example shown in FIG. 7, each beam-forming network is suitable for simultaneously activating two beams (L=2). This allows for the simultaneous formation of:

- in the first geographic region 60*a*: two right-hand circularly polarised beams, serving geographic zones respectively denoted by $RHCP_{1.1}$ and $RHCP_{1.2}$, and two left-hand circularly polarised beams, serving geographic zones respectively denoted by $LHCP_{1.1}$ and $LHCP_{1.2}$,
- in the second geographic region 60*b*: two right-hand circularly polarised beams, serving geographic zones respectively denoted by $RHCP_{2.1}$ and $RHCP_{2.2}$, and two left-hand circularly polarised beams, serving geographic zones respectively denoted by $LHCP_{2.1}$ and $LHCP_{2.2}$.

Part a) of FIG. 7 shows the geographic zones served during a first time slot TS1 of the time window in which the sequences of beams to be formed are defined. Part b) of FIG. 7 shows the geographic zones served during a second time slot TS2 of said time window.

As shown by part a) of FIG. 7, the control module 55 controls the beam-forming networks 54 so as to form, during the time slot TS1 and within the area of geographic overlap between the first geographic region 60*a* and the second geographic region 60*b*, beams $RHCP_{1.2}$ and $LHCP_{2.1}$ serving different respective geographic zones. The other beams serve geographic zones that are located outside of the area of geographic overlap.

As shown by part b) of FIG. 7, the control module 55 controls the beam-forming networks 54 so as to form, during the time slot TS2 and within the area of geographic overlap between the first geographic region 60*a* and the second geographic region 60*b*, beams $RHCP_{1.1}$ and $LHCP_{2.2}$ serving the same geographic zone. The other beams serve geographic zones that are located outside of the area of geographic overlap.

The invention allows a dynamic power distribution to be implemented, within the same beam-forming network 54 (and thus the same geographic region) between the beams of this geographic region. This is carried out by adjusting the complex beam-forming weights so as to prioritise certain beams over others in terms of Equivalent Isotropic Radiated Power (EIRP) as a function of the propagation conditions or communication capacity to be provided. When the propagation conditions are disadvantageous or the communication capacity to be provided over a beam is higher, the power supplied to form this beam can be increased.

The invention further overcomes gradual performance deterioration during the loss of feed elements/power amplifiers preventing the need to provide for redundancy of the power amplifiers on board the satellite. This reduces costs and the duration of satellite integration, while guaranteeing satisfactory quality of service.

FIG. 8 diagrammatically illustrates the main steps of a method 90 for producing a payload 50 according to any one of the embodiments of the invention. As shown in FIG. 8, the production method 90 comprises, for a predetermined configuration of the reflector 51 and array of feed elements 53:

- a step 91 of selecting geographic regions to be served on the Earth's surface, said geographic regions having areas of geographic overlap therebetween,
- a step 92 of selecting, for each geographic region, geographic zones of said geographic region to be served by different beams,
- a step 93 of determining, for each geographic region, a barycentre of the centres of the geographic zones to be served,
- a step 94 of selecting, for each geographic region, a group of feed elements 53 to be used to serve the geographic region considered as a function of the barycentre of said geographic region considered, a step 95 of assembling adaptive analogue beam-forming networks 54 and the array 52 of feed elements 53 such that each adaptive analogue beam-forming network is connected to one of the selected groups of feed elements.

More specifically, the reflector 51 and the array of feed elements 53 are dimensioned, in a conventional manner, so as to serve a predetermined territory on the Earth's surface. The different geographic regions to be served are selected within this territory, in particular while providing areas of geographic overlap where a higher communication capacity may be required. Within the geographic regions thus selected, the geographic zones for which beams may be formed are also selected.

Then, for each geographic region, a barycentre of the centres of the geographic zones to be served is determined and the group of feed elements to be used to serve a geographic region is determined as a function of the determined barycentre for this geographic region. For example, the group of feed elements selected to serve a geographic region corresponds to the feed elements 53 intrinsically having (that is to say considering each feed element 53 alone) the best gain in the direction of the barycentre of said geographic region. Thus, the best feed elements 53 in terms of gain in the direction of the barycentre of the geographic region are selected to form the group of feed elements 53 to be used to serve this geographic region, which optimises the use of the electrical power of the satellite 20. The number $M_n$ of feed elements of each group, which can vary from one group of feed elements 53 to another. As a whole, increasing the number of feed elements of a group reduces the side lobes of the radiation pattern and enlarges the geographic zone to be served. However, the increase in the number of feed elements of a group also results in an increase in the complexity of the associated adaptive analogue beam-forming network.

Once the groups of feed elements 53 have been determined, the adaptive analogue beam-forming networks 54 are connected to the groups of feed elements 53 so as to produce the payload 50 of the satellite 20.

Generally speaking, it should be noted that the embodiments considered above have been described by way of non-limiting examples, and that other alternative embodiments can thus be envisaged.

In particular, the invention described hereinabove can be used in any frequency band; mention can be made, by way of example, of the frequency bands conventionally used by satellite telecommunications systems, such as: C, L, S, X, Ku, Ka, Q/V, W.

Moreover, the invention has been described primarily in the case of a payload 50 solely comprising adaptive analogue beam-forming networks 54. However, according to other examples, the additional provision of at least one static analogue beam-forming network (not shown in the figures) connected to a group of feed elements of the array 52 is not excluded. A group of feed elements connected to a static analogue beam-forming network (i.e. for which the active beams cannot be modified over time) can also share feed elements with groups of feed elements connected to adaptive analogue beam-forming networks 54, or can even be merged with a group of feed elements 53 connected to an adaptive analogue beam-forming network 54.

Moreover, the invention has been described primarily in the case of beam-forming for communications emitted over the user link. However, the invention is also applicable to communications received over the user link, and/or to communications emitted and/or received over the feeder link.

With regard to communications over the feeder link, the same frequency bands can be used for communications from the gateway station 30 to the satellite 20 (uplink feeder link) and for communications from the satellite 20 to the gateway station 30 (downlink feeder link).

Alternatively, different frequency bands can be used over the uplink feeder link and over the downlink feeder link, for example by using:

the W band over the uplink feeder link and the Ka band over the downlink feeder link, or the Q/V band over the uplink feeder link and the Ku band over the downlink feeder link, or the W band over the uplink feeder link and the Ku band over the downlink feeder link, or the Q/V band over the uplink feeder link and the Ka band over the downlink feeder link, etc.

In particular, using the W band over the uplink feeder link is advantageous compared to using the Q/V band, since the spectrum of the W band is, as regards regulatory restrictions, less fragmented and broader than that of the Q/V band. More specifically, broadband applications are often strongly asymmetrical: much more traffic must be conveyed to the user terminals than that received from the user terminals. A much broader bandwidth must thus be provided over the uplink feeder link than over the downlink feeder link.

These considerations regarding the frequency bands of the feeder link apply for different satellite orbits such as satellites in GEO, LEO and MEO. These considerations regarding the frequency bands of the feeder link also apply to all types of telecommunications satellite, including satellites having on-board payloads that are different to the payload 50 according to the present invention. These considerations regarding the frequency bands of the feeder link also apply to the user link.

The description provided hereinabove clearly shows that, via its different features and the advantages thereof, the present invention achieves the objectives set therefor. In particular, the present invention procures high flexibility over a large coverage area with equipment that is not very complex to produce. By way of example, a network comprising approximately 1,000 feed elements 53 ($N_S \approx 1,000$) can be considered with which several thousand different beams can be formed (generally between 2,000 and 3,000) by means of adaptive analogue beam-forming networks 54 of relatively low complexity, capable of simultaneously forming between 2 and 10 active beams ($2 \leq L_n \leq 10$) by using, for example, approximately one hundred feed elements of the array ($M_n \approx 100$, for example equal to 96).

The invention claimed is:

1. A telecommunications satellite intended to be placed in earth orbit, comprising an antenna having a reflector and an array of feed elements wherein:

said satellite comprises adaptive analogue beam-forming networks, said adaptive analogue beam-forming networks being connected to different respective groups of feed elements of the array of feed elements, said groups of feed elements serving different respective geographic regions on the Earth's surface, each adaptive analogue beam-forming network is suitable for simultaneously activating a predetermined number of beams serving respective geographic zones within the geographic region served by the group of feed elements to which said beam-forming network is connected, said satellite comprises a module for controlling said adaptive analogue beam-forming networks, configured so as to modify the active beams of each adaptive analogue beam-forming network, each group of feed elements comprises feed elements shared with other groups of feed elements, and at least one geographic region has a geographic overlap of at least 30% with other geographic regions.

2. The satellite according to claim 1, comprising, for at least one group of feed elements, two adaptive analogue beam-forming networks of different respective polarizations.

3. The satellite according to claim 2, comprising, for each group of feed elements, two adaptive analogue beam-forming networks of different respective polarizations.

4. The satellite according to claim 1, wherein at least two geographic regions have different surface areas.

5. The satellite according to claim 1, wherein the groups of feed elements comprise the same number of feed elements.

6. The satellite according to claim 1, wherein at least two groups of feed elements comprise a different number of feed elements.

7. The satellite according to claim 1, wherein at least two adaptive analogue beam-forming networks are suitable for simultaneously forming different respective numbers of beams.

8. The satellite according to claim 1, wherein the array of feed elements is offset relative to a focal point of the reflector of the antenna.

9. The satellite according to claim 1, further comprising at least one static analogue beam-forming network connected to a group of feed elements of the array of feed elements.

10. The satellite according to claim 1, wherein the adaptive analogue beam-forming networks are suitable for forming beams using different respective frequency bands.

11. The satellite according to claim 1, wherein at least one group of feed elements is constituted by feed elements arranged unevenly.

\* \* \* \* \*